No. 874,092. PATENTED DEC. 17, 1907.
C. H. LIVERPOOL.
EAR TIP FOR STETHOSCOPES AND OTHER AURAL INSTRUMENTS.
APPLICATION FILED JUNE 16, 1906.
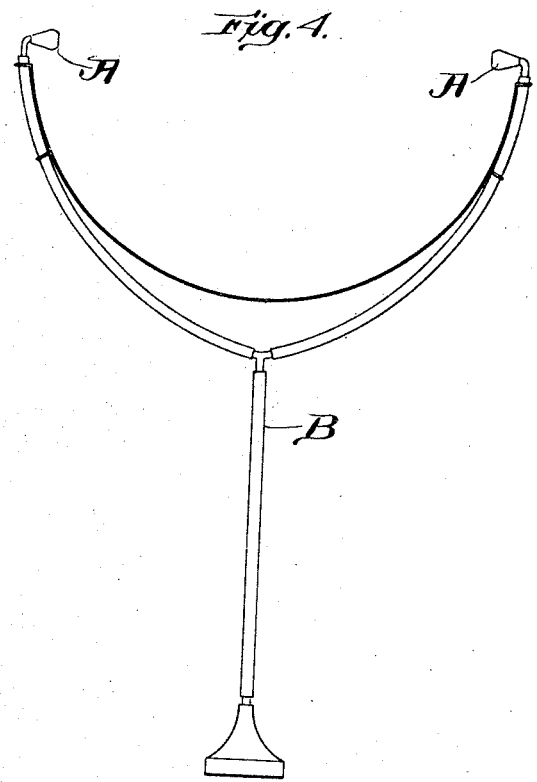
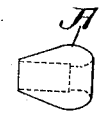  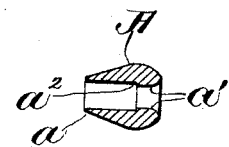
Fig. 1.   Fig. 3.   Fig. 2.
Witnesses:  Inventor:
 Coval H. Liverpool,
 by George A. Rockwell,
 Attorney.

UNITED STATES PATENT OFFICE.

COVAL H. LIVERPOOL, OF BOSTON, MASSACHUSETTS.

EAR-TIP FOR STETHOSCOPES AND OTHER AURAL INSTRUMENTS.

No. 874,092.

Specification of Letters Patent.

Patented Dec. 17, 1907.

Application filed June 16, 1906. Serial No. 322,009.

*To all whom it may concern:*

Be it known that I, COVAL H. LIVERPOOL, of Boston, in the county of Suffolk and State of Massachusetts, have invented a new and useful Ear-Tip for Stethoscopes and other Aural Instruments, of which the following is a specification.

The object of my invention is to provide an ear tip which will convey sound waves accurately; which will exclude external sounds; and which will not have any deleterious effects upon the ear itself, and my invention is an ear tip made of soft rubber and preferably with a shoulder on its interior to hold the tip in place.

In the drawings Figure 1 is an enlarged elevation of a tip embodying my invention; Fig. 2 is an enlarged section of the same; Fig. 3 is a top plan; and Fig. 4 shows a stethoscope with my tips in place.

A is a tip of soft rubber preferably of what is known in commerce as pure gum rubber. The tip is tubular but tapered on the outside to be considerably larger at the end toward the ear than at the other end. The purpose of this is to have as much rubber as possible at that portion of the tip which is to be in contact with the ear. The portion $a$ farthest from the ear is thin, and the object of this is that the portion $a$ may stretch when the stethoscope B or other instrument is inserted and this will allow the insertion of an instrument whose internal diameter will be of the size of the opening $a^1$, and yet portion $a$ will cling to the instrument. When the instrument is fully inserted it bears against annular shoulder $a^2$ which is of the same width as the thickness of the instrument to be inserted, and this furnishes a stop to prevent the instrument entering too far within the tip and possibly within the ear itself, which would of course be a serious matter. Furthermore, the making of the diameter of the tip at $a^1$ of the same diameter as the inner diameter of the instrument insures a smooth, continuous and uninterrupted passage for the sound waves.

In using my tip it is placed upon the end of the arm of the stethoscope or other instrument, and the shoulder engages the end of the instrument, and it is then placed against the ear, and the largest outer diameter of the tip is a little larger than the orifice of the normal ear, and as the instrument is ordinarily held to the ear by a spring or the like there is a certain pressure which makes the soft rubber accurately fit the orifice and effectually close it so that if there is any irregularity in the shape of the orifice of the ear, it will be allowed for by the rubber tip, and all external sounds will be effectually excluded so that the ear of the user will be acted upon solely by the sound waves which come through the stethoscope.

It generally happens that the user of a stethoscope will move his head with relation to the stethoscope, and this causes a turning of the ear tip in the ear, and my ear tip turns without the noise which has been present in prior ear tips made of a material which will not yield, and a certain grinding sound has heretofore been present, which although insignificant as compared with some sounds, is loud compared with the sounds which are conveyed through the instrument, and consequently may interfere with a proper diagnosis. Furthermore, this turning causes an irritation to the ear itself which is entirely overcome by the yielding of my ear tip.

My tip has the further advantage that it will fit any stethoscope, and furthermore, will adjust itself accurately to any inequalities that may be present in the outside of the stethoscope, with the result that a careful finishing of the instrument is not essential, and the clinging of the tip to the outside of the instrument insures the perfect exclusion of external sounds which would probably be admitted between the tip and instrument if a material were used which required some means of attaching it to the instrument.

Although my tip is securely held to the instrument without glue or cement which would injure the tip in case it was to be removed, nevertheless I can easily remove my tip for any purpose, such as sterilizing, for example. Further advantages of my tip are that it will last a very long time because it will not become broken or injured in removing it, and it is much cheaper to manufacture as it need not be turned, drilled or tapped out but is preferably molded.

My tip may be used with a number of medical aural instruments, and also to advantage with other aural instruments, such, for example, as ear trumpets.

What I claim is:

The above described tip made of a single piece of soft rubber and comprising a socket open at one end to receive the end of the tube, and made at its opposite end with an abutment for engaging the outside of the ear socket to limit the entrance of the tip into the ear of the user, and a protuberance extending beyond the abutment to enter and fit itself to the ear socket so as to hold the tip against displacement laterally and furnish means of support for the instrument, said protuberance being of smaller diameter than the abutment, and the tip being tapered from the abutment to the open end of the socket and being of very slight thickness at that open end to provide a yielding but clinging joint with the tube and thereby prevent all sound from entering at the joint.

COVAL H. LIVERPOOL.

Witnesses:
G. A. ROCKWELL,
ROSWELL F. HATCH.